Patented Nov. 29, 1949

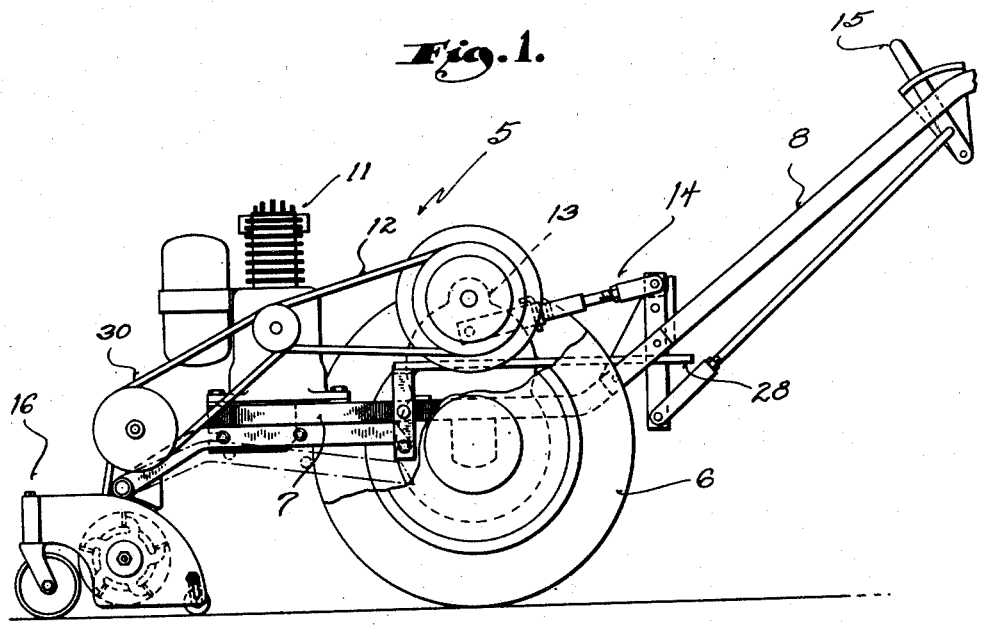
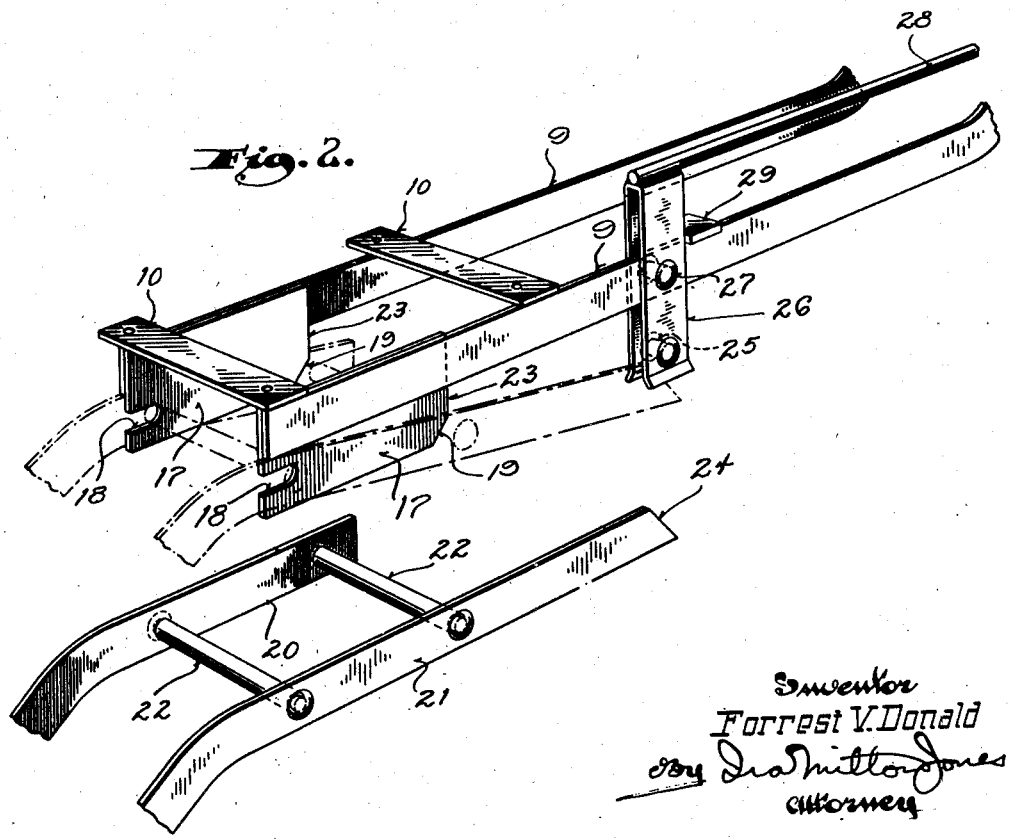

2,489,274

UNITED STATES PATENT OFFICE 2,489,274

TRACTOR HITCH

Forrest V. Donald, Milwaukee, Wis., assignor to Simplicity Manufacturing Company, Port Washington, Wis., a corporation of Wisconsin Application June 13, 1947, Serial No. 754,482

5 Claims. (Cl. 56—26)

This invention relates to so-called garden tractors and refers particularly to the hitch by which attachments or implements such as lawn mowers, cultivators and sickle bars are connected to the tractor.

Patent No. 2,368,290 issued January 30, 1945, to Forrest V. Donald discloses a relatively simple hitch for removably securing various attachments to the frame of a garden tractor, but while it is possible with the construction of said patent to establish the initial connection between the tractor and the implement or attachment by "walking" the tractor up to the attachment, hooking the tractor frame onto the attachment and thereafter picking up the attachment by rocking the tractor frame about its transverse wheel axis, final and complete securement of the attachment to the tractor requires further attention of the operator, specifically the tightening of two clamping screws.

With a view toward achieving even greater convenience the present invention has as its object to provide an improved manner of connecting an attachment to a tractor whereby the complete connection is established without the need for tightening clamping screws or performing any other similar act, simply by engaging a part on the tractor frame with a cooperating part on the implement or attachment, and rocking the tractor about its transverse wheel axis.

Another object of this invention is to provide an improved manner of connecting an attachment to a garden tractor whereby disengagement of the attachment as well as its connection to the tractor can be quickly and easily effected entirely without the need for tools or loosening clamping screws.

More specifically it is an object of this invention to provide a connection for readily removably securing an attachment to a tractor which incorporates a readily releasable latch automatically engaged during the connection of the attachment to the tractor and readily releasable by slight pressure applied to a releasing finger positioned to be engaged by the toe of the operator.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a side view of a tractor equipped with the hitch device of this invention, and illustrating a lawn mower attached to the tractor; and Figure 2 is a perspective view illustrating the elements of the connector or hitch with the attachment carried parts shown separated from the tractor in full lines and in the process of being connected in dotted lines.

Referring now particularly to the accompanying drawing, the numeral 5 designates generally a tractor which may be of the type shown in the aforesaid Patent No. 2,368,290. While the tractor of the aforesaid patent has only a single traction wheel, the tractor here shown has two traction wheels 6 mounted at opposite sides of a frame 7, but as in the patent the tractor may be rocked about its transverse wheel axis by means of handle bars 8 connected to the frame 7.

The frame 7 comprises two parallel rails 9 connected at their forward ends by transverse plate members 10 upon which the engine 11 is mounted. Any suitable means may be employed to drivingly connect the engine with the traction wheels, as for instance a belt drive 12 and a gear transmission, not shown, housed within a gear case 13.

The gear case 13 is arranged to be swung about the transverse wheel axis by linkage 14 connected between the gear case and a control lever 15 mounted on the handlebars 8. In this manner the transmission belt 12 can be tightened or slackened to control the transmission of power to the traction wheels.

Inasmuch as the specific construction of the tractor forms no part of the invention further description thereof is deemed unnecessary.

The hitch for connecting attachments such as the lawn mower 16 to the frame of the tractor constitutes the main feature of the present invention; and while these attachments in some cases may be more aptly considered implements, where the term "attachments" is employed in this specification and the claims it covers any device designed for connection to the tractor.

As in the aforesaid patent the connector or hitch of this invention incorporates cooperating parts on the tractor frame and on the attachment. Interengagement of these cooperating parts establishes the connection. The tractor frame carried part comprises two depending flanges or plates 17 fixed to the forward ends of the frame members 9. Each of these flanges or plates has a notch or open socket 18 opening to its front edge and equispaced from the top of the tractor frame so as to be horizontally opposite each other.

The rear edges of each flange or plate 17 have their lower corners cut off at an angle to provide cam surfaces 19. These surfaces like the notches or sockets 18 are transversely opposite each other.

The attachment, i. e., the lawn mower 16 in the present instance, has a pair of spaced arms 20 and 21 projecting rearwardly therefrom in such a way that when the attachment is not connected to the tractor, the outer ends of these arms are inclined downwardly as shown in dotted lines in Figure 1. Cross pins 22 hold the arms 20 and 21 spaced apart a distance to snugly embrace therebetween the flanges or plates 17, and inasmuch as the flanges or plates 17 are secured to the inner faces of the frame rails 9 the arms 20 and 21 occupy positions directly under the rails 9 when the connection is established.

The distance between the pins 22 is such that when the forward pin is engaged in the notches or sockets 18 the rear cross pin may be engaged with the straight vertical rear edges 23 of the flanges or plates by relative rocking or swinging movement between the tractor and the attachment about the pivot provided by the engagement of the forward pin 22 in the notches 18. Such engagement between the rear cross pin and the edges 23 holds the front pin 22 in the notches 18.

One of the arms which constitute the attachment carried part of the connector, the arm 21 in this instance, extends rearwardly a substantial distance beyond the rear end of the other arm. Its extreme rear end is cut off at an angle to provide a cam surface 24. This surface is so positioned when the front cross pin 22 is engaged in the notches 18 as to have camming engagement with the "bolt" 25 of a latch 26. The latch 26 comprises a U-shaped member straddling the adjacent rail 9 and pivoted thereto as at 27.

The upper closed end of this latch member has a rod 28 secured thereto and extending rearwardly therefrom to have its rear free end positioned to be lifted by the toe of the operator, such action releasing the latch. When the latch is free the weight of the rod 28 holds the latch in its operative position defined by a stop 29 so that during the establishment of the connection between the tractor and attachment it is only necessary to "walk" the tractor up to the attachment with its front end lowered to engage the notches 18 with the forward cross pin 22, and then push down on the handlebars.

Downward pressure on the handlebars rocks the tractor about its transverse wheel axis to lift the front end of the tractor. This action causes relative rocking or swinging motion between the cooperating parts of the hitch about the pivot provided by the engagement of the front pin 22 in the notches 18 thereby bringing the rear cross pin against the cam surfaces 19 as shown in dotted lines in Figure 2. As the rear cross pin rides up on the cam surfaces 19 the front pin 22 is drawn fully into the notches 18 allowing the rear cross pin 22 to engage behind the vertical edges 23.

At this point the attachment arms 20—21 are held against all motion relative to the tractor with the exception of the described rocking or swinging motion about the pivot provided by the engagement of the front pin 22 in the notches 18.

During the final rocking motion the cam surface 24 on the arm 21 engages the "bolt" 25 of the latch 26, swinging the same out of its path until the lower edge of the cam surface 24 lies above the "bolt" 25 whereupon the latch automatically swings forwardly into locking position. To effect release of the attachment it is only necessary to lift the latch release rod 28 with the toe thus freeing the arm 21 and allowing the tractor to be disengaged from the attachment.

In the case of the lawn mower there is, of course, the further requirement in effecting a driving connection between the cutting reel and the engine. This may be done in any suitable manner as by means of a removable belt 30 and suitable pulleys.

From the foregoing description taken in connection with the accompanying drawing, it will be readily apparent to those skilled in the art that this invention provides an exceedingly simple manner of quickly removably securing an attachment to a garden tractor and that it entirely eliminates all need for the use of tools or even the manual drawing up or tightening of thumb screws or other clamping devices.

What I claim as my invention is:

1. A hitch device by which an attachment may be quickly connected to a garden tractor having a transverse wheel axis about which the tractor may be rocked, said hitch device comprising: an elongated substantially horizontal frame part at all times carried by said tractor; another elongated substantially horizontal frame part at all times carried by said attachment; a vertical flange carried by one of said frame parts and extending along a portion of the length of said frame part, said flange having a substantially horizontal slot opening to one of its ends and a substantially vertical shoulder horizontally spaced from said slot; a member on the other frame part engageable in said slot upon relative horizontal motion between said frame parts; a second member on said other frame part engageable with said shoulder upon relative rocking motion of said frame parts about the axis of said first named member when the same is received in said slot; and a latch pivotally secured to said first named frame part, adjacent to the end of the flange thereon remote from said slot, said latch being adapted to releasably engage said other frame part to preclude relative rocking motion between said frame parts.

2. In combination with a garden tractor and an attachment therefor, a readily separable connection between the tractor and the attachment comprising: superimposed elongated substantially horizontal frame members at all times carried by the tractor and the attachment respectively; a transverse pin on one of said frame members; means on the other of said frame members defining a substantially horizontal slot in which said pin is received to permit relative rocking motion between the frame members around the axis of the pin and out of their superimposed position, said pin being disengageable from said slot by relative horizontal motion between the frame members in one direction and precluding relative horizontal motion between the members in the other direction; cooperating means on said frame members for precluding relative horizontal motion between them in said first named direction, said means being disengageable by relative rocking movement of the frame members out of their superimposed position; and a latch pivotally secured to one of said frame members and readily detachably engaged with the other frame member to preclude relative rocking motion of the frame members out of their superimposed position.

3. A hitch for connecting a garden tractor with an attachment, said garden tractor and said attachment each having a main frame comprising substantially parallel elongated horizontal members, said hitch comprising: a downwardly directed flange on each of the horizontal members of the main frame of the tractor, said flanges having a set of aligned substantially horizontal notches opening to one of their ends and aligned substantially vertical shoulders horizontally spaced from said notches; a pin member on the main frame engageable with said notches by horizontal relative motion between the frame members of the tractor and the frame members of the attachment, said pin member enabling relative rocking motion between said frame members about the axis of the pin member when the latter is engaged in said notches; a second pin member on the main frame engageable with said shoulders on the flanges by relative rocking motion in one direction between said frame members and adapted, by engagement with the shoulders, to preclude relative horizontal motion between said frame members; and a latch member pivotally connected to one of said frame members and adapted to releasably engage the other frame member to preclude relative rocking movement between said frame members in a direction to disengage said second pin member from said shoulder, said latch being biased toward its position of engagement with said other frame member and being adapted to be pivotally cammed to one side of said position by said other frame member during relative rocking movement of said frame members toward the position at which said second pin member is engaged with said shoulders.

4. A hitch for connecting a garden tractor with an attachment, said garden tractor and said attachment each having a main longitudinal frame comprising substantially parallel elongated horizontal members, said hitch comprising: a pair of spaced apart parallel transverse pin members secured to the frame members of said attachment; a downwardly directed flange on each of the frame members of the tractor, each of said flanges having a substantially horizontal notch opening to one end thereof, the notches on the two flanges being in transverse alignment with one another and adapted to receive one of the pin members on the attachment upon relative substantially horizontal movement between the tractor and the attachment, each of said flanges also having a substantially vertical shoulder adapted to be engaged by the other pin member upon relative rocking motion between the tractor and attachment in one direction to an operative connected position about the axis of said first named pin member when the same is received in said horizontal notches; and a latch pivotally secured to one of the frame members of the tractor and adapted to releasably engage a frame member on the attachment to preclude relative rocking motion of the tractor and attachment out of its operative connected position.

5. In combination with a garden tractor and an attachment therefor, a readily separable connection between the tractor and the attachment comprising: superimposed elongated substantially horizontal frame members at all times carried by the tractor and the attachment respectively; a readily separable hinge connection between the frame members of the tractor and the frame members of the attachment, said hinge connection permitting relative rocking motion betweeen said frame members about an axis transverse to the frames and out of their superimposed position, and being separable by horizontal relative movement in one direction between said frame members while precluding relative horizontal motion in the other direction; cooperating shoulders on said frame members for precluding relative horizontal movement between said frame members in said first named direction, said shoulders being disengageable by relative rocking movement of said frame members out of their superimposed position; and a readily releasable latch pivotally secured on one of said frame members and detachably holding the other to preclude such relative rocking motion between the frame members out of their superimposed position.

FORREST V. DONALD.

REFERENCES CITED

The following references are of record in the file of this patent:

UNITED STATES PATENTS

| Number | Name | Date |
| --- | --- | --- |
| 774,903 | Ammann | Nov. 15, 1904 |
| 2,368,290 | Donald | Jan. 30, 1945 |